United States Patent [19]
Fairhurst

[11] Patent Number: 5,136,368
[45] Date of Patent: Aug. 4, 1992

[54] TELEVISION SIGNAL DECODER WITH IMPROVED ARCHITECTURE

[75] Inventor: Jon Fairhurst, Grass Valley, Calif.

[73] Assignee: The Grass Valley Group, Inc., Nevada City, Calif.

[21] Appl. No.: 645,375

[22] Filed: Jan. 24, 1991

[51] Int. Cl.$^5$ .................. H04N 9/66; H04N 17/04
[52] U.S. Cl. ........................... 358/10; 358/23
[58] Field of Search ...................... 358/23-25, 358/10, 139; 371/16

[56] References Cited

U.S. PATENT DOCUMENTS

| | | | |
|---|---|---|---|
| 4,743,958 | 5/1988 | Bannister et al. | 358/11 |
| 4,821,269 | 4/1989 | Jackson et al. | 371/16 |
| 5,008,740 | 4/1991 | Phillips et al. | 358/23 |

*Primary Examiner*—James J. Groody
*Assistant Examiner*—Mark R. Powell
*Attorney, Agent, or Firm*—John Smith-Hill

[57] ABSTRACT

In a new television signal decoder architecture, a mixer switches between two inputs, A and B, using an envelope function C, according to the relationship: Ouput = $A*C + B(1-C)$, where A is either the composite television signal input in normal operation or a first test signal memory in test signal generation operation, and B is either a fixed blanking level in normal operation or a second test signal memory in test signal generation operation. A test signal generator and blanking sequencer provides the test signals to the two test signal memories and an envelope control signal to the envelope generator telling it when and in which direction to supply the transition envelope to the mixer. A variable electrical length front end is created by a microprocessor that recalls from its memory the timing associated with a particular composite video source and directs a timing circuit to wait an appropriate amount of time before releasing a frame of video stored in a FIFO buffer memory to the rest of the decoder. A bus is shared by sync signals and signals from diagnostic points of interest and is alternatively controlled by the sync generation circuitry during normal operation and the microprocessor during diagnostics.

11 Claims, 6 Drawing Sheets

TELEVISION SIGNAL DECODER WITH IMPROVED ARCHITECTURE

BACKGROUND OF THE INVENTION

This invention relates to the field of the decoding of composite television signals, and more particularly to the field of an improved architecture for a decoder of composite television signals such that the performance is improved while the cost of manufacturing is simultaneously reduced.

A composite television signal consists of a main carrier of luminance information onto which a quadrature modulated subcarrier containing two components of quadrature modulated chrominance has been added. A decoder, at a minimum, must be able to separate the carrier and subcarrier signals, to produce a luminance output based on the content of the main carrier, and quadrature demodulate the subcarrier to produce two chrominance components.

To be commercially viable, a decoder should also perform dc restoration of the input and output, blanking processing, including output sync signal addition, internal test signal generation, superior filtering, local and remote control of user adjustable parameters, matrix conversion to at least some and preferably all of the standard and nonstandard component formats, have a variable electrical length to ease system timing requirements, and contain features which aid in the adjustment and troubleshooting of the decoder itself.

Referring to FIG. 1, a typical prior art television signal decoder performs blanking on the separated red, green and blue signals immediately prior to sending them out as outputs. Test signal generation is also typically switched into the component red, green and blue color signals, just before sync and blanking processing. It would be desirable to build a television signal decoder with an improved architecture that performs these same functions more efficiently and effectively than they have been performed in the prior art.

SUMMARY OF THE INVENTION

Accordingly, one object of the present invention is to provide a novel architecture for a television signal decoder that is more efficient and effective in its overall design. This object is achieved by a new decoder design that integrates blanking processing and internal test signal generation (TSG) early in the signal path, and that permits sync to be easily added at the output.

Another object of the present invention is to provide a means for handling timing problems that arise in the studio environment by giving an operator of the decoder control over its apparent electrical length. This object is achieved by a variable electrical length input circuit that automatically compensates for differing delays associated with various sources of composite video inputs.

Yet another object of the present invention is to provide a diagnostic bus to aid in adjustment and troubleshooting of the decoder. This object is achieved by a shared sync and diagnostic bus and an alternate means of controlling it depending on whether normal or diagnostic operation is to occur.

In a preferred embodiment of the present invention, a mixer switches between two inputs, A and B, using an envelope function C, according to the relationship: Output=A*C+B(1−C), where A is either the composite television signal input in normal operation or the output of a first test signal memory in test signal generation operation, and B is either a fixed blanking level in normal operation or the output of a second test signal memory in test signal generation operation. A test signal generator and blanking sequencer provides the test signals to the two test signal memories and an envelope control signal to the envelope generator telling it when and in which direction to supply the transition envelope to the mixer. A variable electrical length front end is created by a microprocessor that recalls from its memory the timing associated with a particular composite video source and directs a timing circuit to wait an appropriate amount of time before releasing a frame of video stored in a FIFO buffer memory to the rest of the decoder. A bus is shared by sync signals and signals from diagnostic points of interest and alternatively controlled by the sync generation circuitry during normal operation and the microprocessor during diagnostics.

BRIEF DESCRIPTION OF THE DRAWINGS

For a better understanding of the invention, and to show how the same may be carried into effect, reference will now be made, by way of example, to the accompanying drawings in which like reference characters refer to like elements, and.

DETAILED DESCRIPTION

A color television signal decoder, in a most general sense, receives a composite (NTSC or PAL) television signal and from it produces a component television signal in any of the "3-wire" formats, such as RGB, Beta, EBU-N10, etc., or possibly a multiplexed format, such as MAC or 4:2:2.

Figure 1:
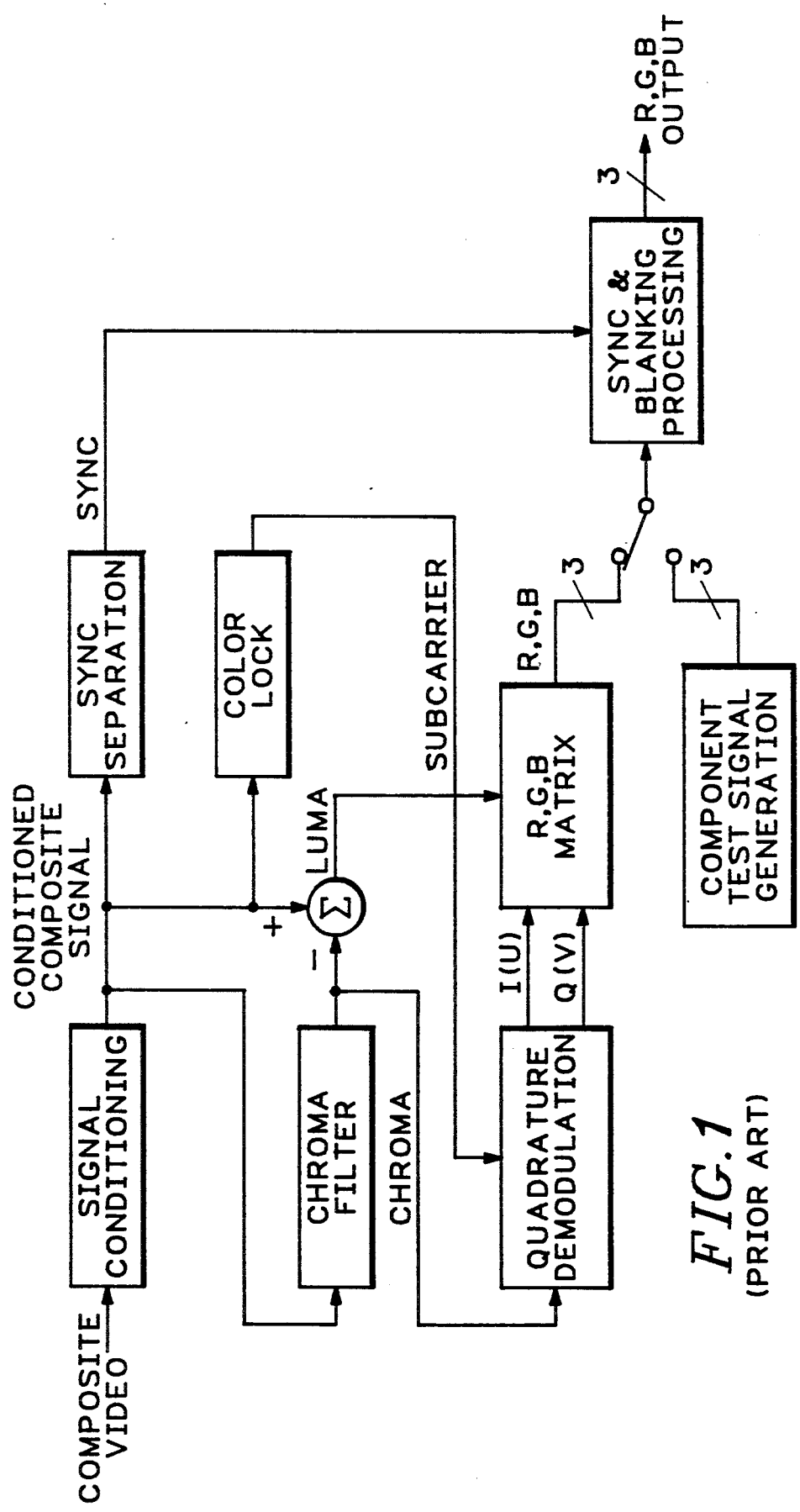
FIG. 1 is a block diagram of a typical prior art color television signal decoder.

Referring to FIG. 1, a typical prior art color television signal decoder conditions the composite video signal input by performing such operations as buffering, clamping, clipping, etc. The conditioned composite video signal is filtered to separate the chrominance quadrature modulated subcarrier from the composite signal. The chrominance signal is then subtracted from the composite signal to produce the luminance signal, and quadrature demodulated to produce I and Q color signals in NTSC or U and V color signals in PAL. The quadrature demodulation process requires phase locking to the subcarrier. The I, Q and luminance signals are then converted to red, green and blue signals by the R,G,B matrix. Sync and blanking processing is then performed and an R,G,B output produced. Optionally, there may be a component test signal generator providing an alternate source of R,G,B signals to the sync and blanking processor.

Figure 2:
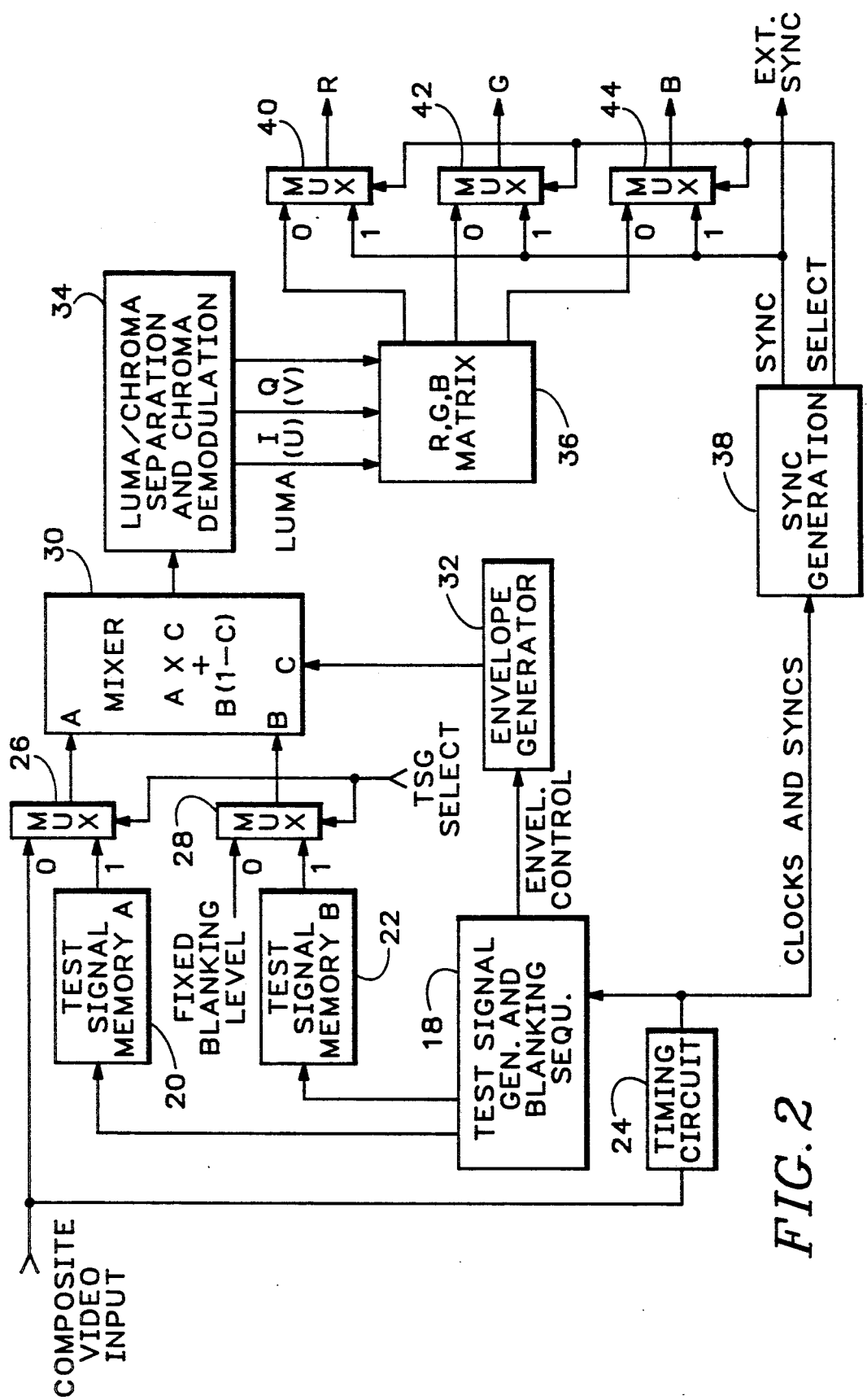
FIG. 2 is a block diagram of a portion of the improved color television signal decoder according to the present invention showing how test signal generation and blanking processing are integrated.

Referring to FIG. 2, one aspect of the present invention is a new approach to integrating blanking processing, internal test signal generation and output sync addition. A composite color television signal is monitored by a timing circuit 24 and is one input to multiplexer 26. The other input to multiplexer 26 is a test signal stored in test signal memory A 20. The timing circuit 24 produces a clock signal and horizontal and vertical sync signals, which are sent to a TSG (test signal generator) and blanking sequencer 18 and sync generation circuit 38.

It is desirable to include test signal generation early in the signal path, where there is only a single channel of information, and where it will pass through the maximum amount of down stream circuitry increasing its usefulness in troubleshooting, test and alignment. Traditionally, it has not been done this way because test signal generators were oriented toward producing component test signals, such as R,G,B. Starting with that equipment, one would need a high quality encoder to convert those component test signals into a composite signal for injection early in the signal path and that would be economically unfeasible.

In the architecture of the present invention, the TSG (test signal generator) and blanking sequencer 18 produces two test signals, each one one subcarrier cycle long (four samples). This one cycle of information can be repeatedly used to produce as much as is desired of a particular set of luminance and chrominance values, as in a color bar pattern. The TSG and blanking sequencer 18 is a simple state machine that receives clocks and horizontal and vertical sync signals, and other input lines that select between normal video and a variety of test patterns. The clock and sync signals are used to keep track of the present location within the video stream in terms of frames, lines and pixels. Such a state machine can be constructed from control logic, EPROM and registers.

Although it has not previously been done this way, blanking is most advantageously performed early in the decoder chain, where there is a single channel of information. To accomplish this, a mixer 30 uses the envelope C generated by an envelope generator 32 to make a smooth transition between two inputs A and B. The envelope shape is preferably a $\sin^2(x)$ function. The mixer 30 uses the envelope C by producing an output that is the sum of $A*C+B(1-C)$, so that as C goes from 1 to 0 over a number of samples, typically about ten, the output of the mixer transitions from all A, which is typically the composite color television signal, to all B, which is typically the fixed blanking level. The envelope generated must be smooth in order to prevent out-of-band energy due to excessively abrupt transitions.

The envelope control signal from the TSG and blanking generator 18 is a single bit that acts as a trigger to the envelope generator 32, causing it to produce an envelope for a transition from zero to one after the envelope control signal changes from zero to one, and causing it to initiate an envelope for a transition from one to zero after the envelope control signal changes from one to zero. The envelope generator uses the same stored data to produce both envelopes, simply reading that data out in the opposite order to produce the opposite transition.

The mixer 30 can effect a transition between composite video and blanking when multiplexers 26 and 28 are passing their top inputs while TSG select is zero, or between one chrominance and luminance test signal sequence (4 pixels) stored in test signal memory A 20 and another chrominance and luminance test signal sequence stored in test signal memory B 22 when the multiplexers are passing their lower inputs while TSG select is one. TSG select is controlled by operator commands or a front panel switch and is gated to only change states during the blanking interval.

To produce a color bar, as mentioned above, the first color to be generated is loaded into test signal memory A 20, and the blanking level is loaded in test signal memory B 22. TSG select changes from a zero to a one during the blanking interval while C is a zero and the mixer 30 output is B. At that time multiplexers 26 and 28 begin passing their lower inputs from the test signal memories A 20 and B 22, but because test signal memory B 22 is loaded with the blanking level, no change is felt on the B input of the mixer 30. Then, as that blanking period ends, the envelope generator 32 supplies an envelope that smoothly changes C from zero to one, and the first color of the test pattern passing from test signal memory A 20 through multiplexer 26 is increasingly felt through the mixer 30 as C approaches its full value.

During the interval of the first color bar within one horizontal sweep, test signal memory B 22 is loaded with another test signal sequence representing the color of the next color bar in the test pattern. At the end of the first color bar the envelope control signal changes back to zero and the envelope generator 32 begins to change C smoothly back to zero in response, causing the mixer 30 output to transition to the next color.

Because in PAL format systems there is a 25 Hz offset between the horizontal information and the subcarrier frequency, a color bar input that is not adjusted for this effect would produce a slightly diagonal edge rather than truly vertical edges, with the image drifting horizontally by one pixel location every 157 lines. However, with the architecture of the present invention, this effect can be compensated for and equivalent horizontal locations made vertical by storing 157 differently phased envelopes in the envelope generator 32. The following table illustrates how the $\sin^2(x)$ values are phased over the 157 envelopes:

| TABLE OF EXAMPLE ENVELOPE VALUES | | |
| --- | --- | --- |
| NORMAL PAL (56 ns intervals) | 28 ENVELOPES LATER (delayed 10 ns) | 157th ENVELOPE END OF PATTERN |
| 0.0000 | 0.0000 | 0.0000 |
| 0.0425 | 0.0288 | 0.0000 |
| 0.1629 | 0.1364 | 0.0425 |
| 0.3406 | 0.3059 | 0.1629 |
| 0.5457 | 0.5084 | 0.3406 |
| 0.7424 | 0.7094 | 0.5457 |
| 0.8983 | 0.8748 | 0.7424 |
| 0.9864 | 0.9765 | 0.8983 |
| 1.0000 | 1.0000 | 0.9864 |
| 1.0000 | 1.0000 | 1.0000 |

Note that by the time that the 157th envelope is reached, the last values are the same as the first values, only displaced by one pixel location in time.

Returning to FIG. 2, the output of the mixer 30 is separated into chrominance and luminance signals and the chrominance signal is demodulated into its component parts by block 34, which contains the following blocks of standard circuitry shown in FIG. 1: chroma filter, subtractor to produce luma, color lock and quadrature demodulation circuitry. The luminance signal and chrominance components are then applied to matrix 36 which produces R,G,B outputs for NTSC systems. The R,G,B outputs of the matrix 36, or Y,U,V outputs directly in PAL systems, are sent, respectively, to multiplexers 40, 42 and 44, where they have sync information from the sync generation circuitry 38 switched into them at appropriate times by the sync select signal. The sync select signal is also generated by the sync generation circuitry 38.

As can be seen from the foregoing description, the decoder architecture of the present invention is unique and efficient in using a single mixer and envelope generator to serve the dual purpose of providing smooth transitions between the composite input and the blanking level and smooth transitions between different portions of the test pattern. Since the signal has been accurately blanked in the composite domain, the resulting component signal is also accurately blanked and this allows the sync signal to be "switched" into the three component channels by multiplexers 40, 42 and 44 without any need for a "smooth" transition which would require three mixers.

The improved decoder architecture of the present invention can be used in either digital or analog implementations, with digital being preferred. In such a digital implementation, all of the signals and blocks are assumed to be digitally implemented, with any conversion to or from analog performed by A/D and D/A converters, as is well known in the art.

In the television studio environment, the disparate propagation delays associated with various sources of composite video input make signal timing a difficult problem. A television signal decoder front end having the capability of being able to vary its apparent electrical length by up to one frame of video would provide a solution to many of these problems.

Figure 3:
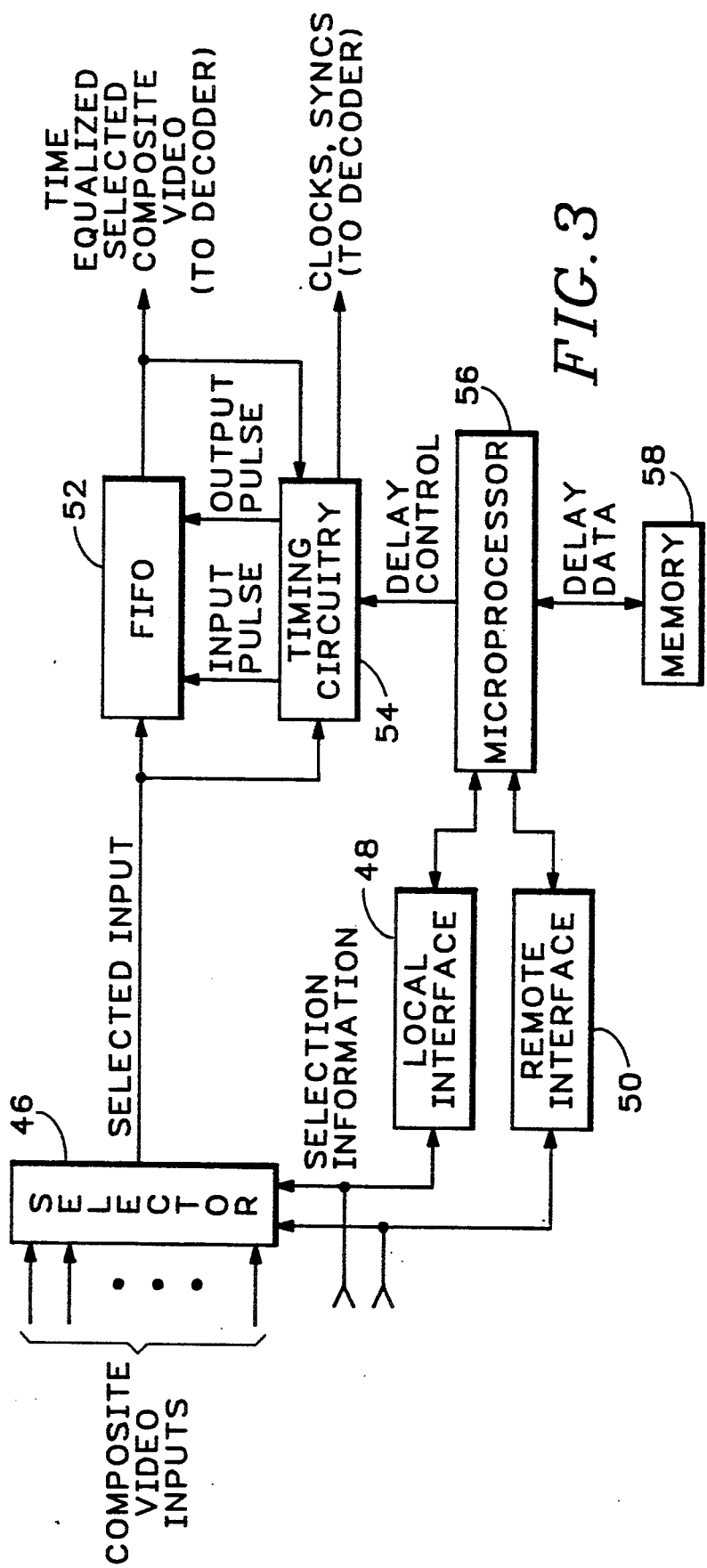
FIG. 3 is a block diagram of a portion of the improved color television signal decoder according to the present invention showing how variable electrical length compensation is accomplished.

Referring now to FIG. 3, such a variable electrical length compensating front end for a color television signal decoder is shown in block diagram form. A selector 46 or router has available at its input a number of sources of composite video signals arriving from different distances with various amounts of delay. Selection information either originates from, or is made available to, the local interface 48 or remote interface 50. This selection information is made available to a microprocessor 56 or other controller within the television signal decoder.

The microprocessor 56 has previously been provided with delay data corresponding to each of the sources of composite video inputs and has stored this information in memory 58. As selections are made, the microprocessor 56 monitors the selection information made available to it by the local interface 48 or remote interface 50 and automatically retrieves the corresponding delay data from its memory 58 and passes appropriate delay control signals to timing circuitry 54.

The timing circuitry 54 monitors the selected input from the selector 46 and derives from it $t_0$, the start of frame time. In response to $t_0$, the timing circuitry 54 generates an input pulse that starts the FIFO 52 (first in, first out buffer memory) storing the selected input signal. FIFO 52 must have a capacity of at least one full frame of composite video signal to guarantee adequate timing compensation in all cases. The timing circuitry generates an output pulse to initiate output from the FIFO 52 after a delay determined by the delay control signal from the microprocessor 56. The timing circuitry 54 monitors the time equalized selected composite video output of the FIFO 52 and from it generates clock signals and sync signals for the decoder that are appropriate to the time equalized selected composite video that the decoder is receiving from the FIFO 52.

By means of the circuitry shown in FIG. 3, the timing circuitry 54 can now be switched between the timing of one input and the timing of another input while producing a stable output, so long as the actual delays associated with each input are known in advance and the external selector 46 takes some fraction of a vertical interval, e.g. 500 microseconds, to respond to input selection changes. The latter requirement arises from the fact that the microprocessor 56 needs time to respond to a changed input selection by retrieving a new delay value and forwarding it to the timing circuitry 54.

Figure 4:
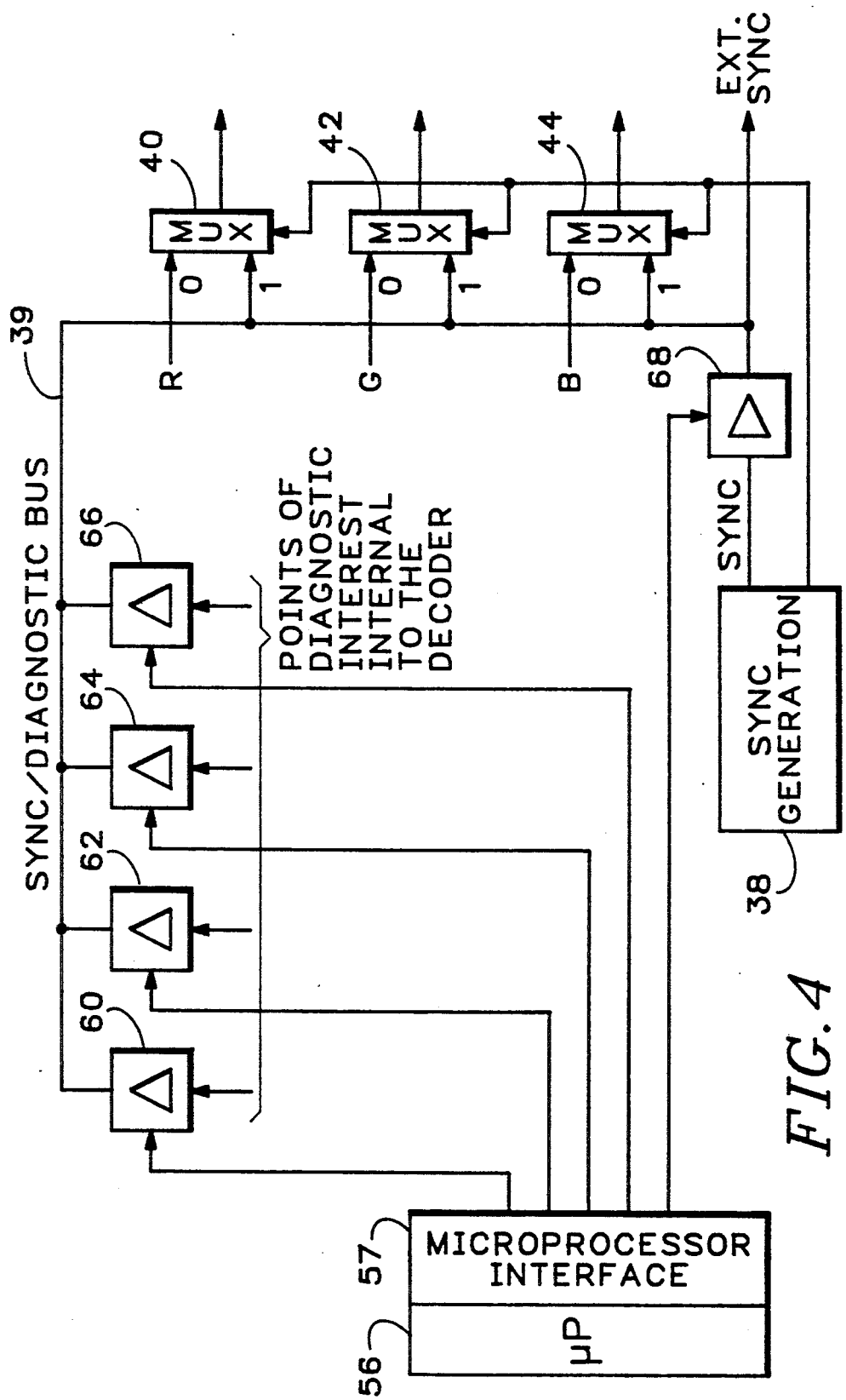
FIG. 4 is a block diagram of a portion of the improved television signal decoder according to the present invention showing how the sync/diagnostic bus is controlled.

Referring now to FIG. 4, the sync generation circuitry 38 shown in FIG. 2 is shown here again within a different context. The sync signal line, shown in FIG. 2 as only going to the multiplexers 40, 42, 44 and to the external sync output, is shown in FIG. 4 extended to become a sync/diagnostics bus 39. The sync signal now must pass through tri-state buffer 68 to get onto this sync/diagnostics bus 39. The other sources of signals for this sync/diagnostics bus 39 are points of interest from a diagnostics point of view. While such points of interest will generally be internal to the decoder, an external test signal source could also be made available through this route. Access to the sync/diagnostics bus 39 is controlled by the microprocessor 56 through its interface 57, with only one tri-state buffer 60, 62, 64, 66 or 68 being permitted to control the bus at any one time, and the rest kept in their high impedance third state.

During normal operation of the decoder, only tri-state buffer 68 is enabled and the rest of the tri-state buffers 60, 62, 64, 66 are tri-stated. However, during diagnostics the microprocessor can tri-state tri-state buffer 68 and provide access to any of the internal points of diagnostic interest and make the activity at that point available on the external sync output. Efficiency derives from the fact that sync/diagnostics bus and external sync output are utilized for multiple purposes.

Figure 5A:
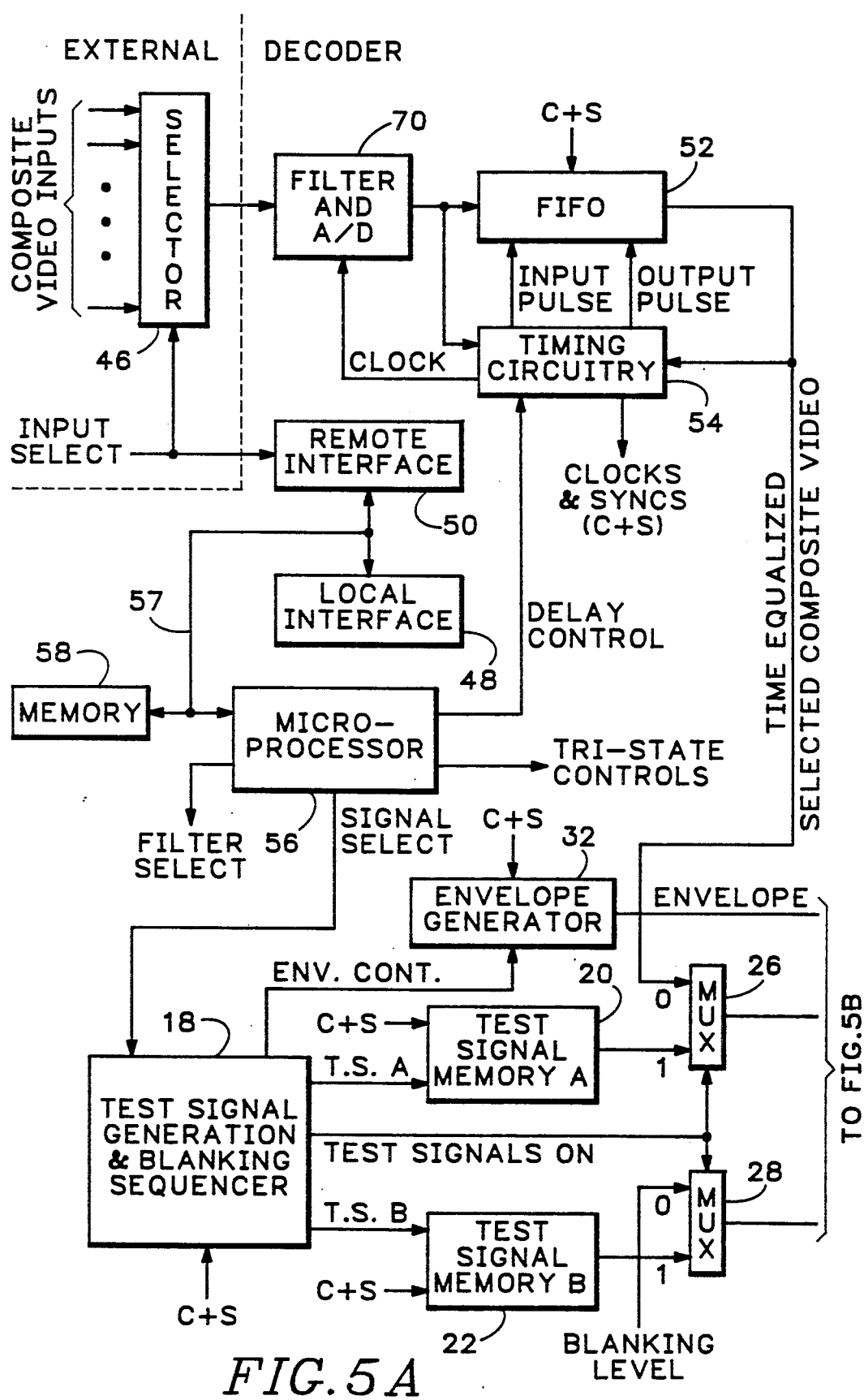
FIG. 5–5A is a block diagram showing how the various parts of the improved television signal decoder according to the present invention operate together.
Figure 5B:
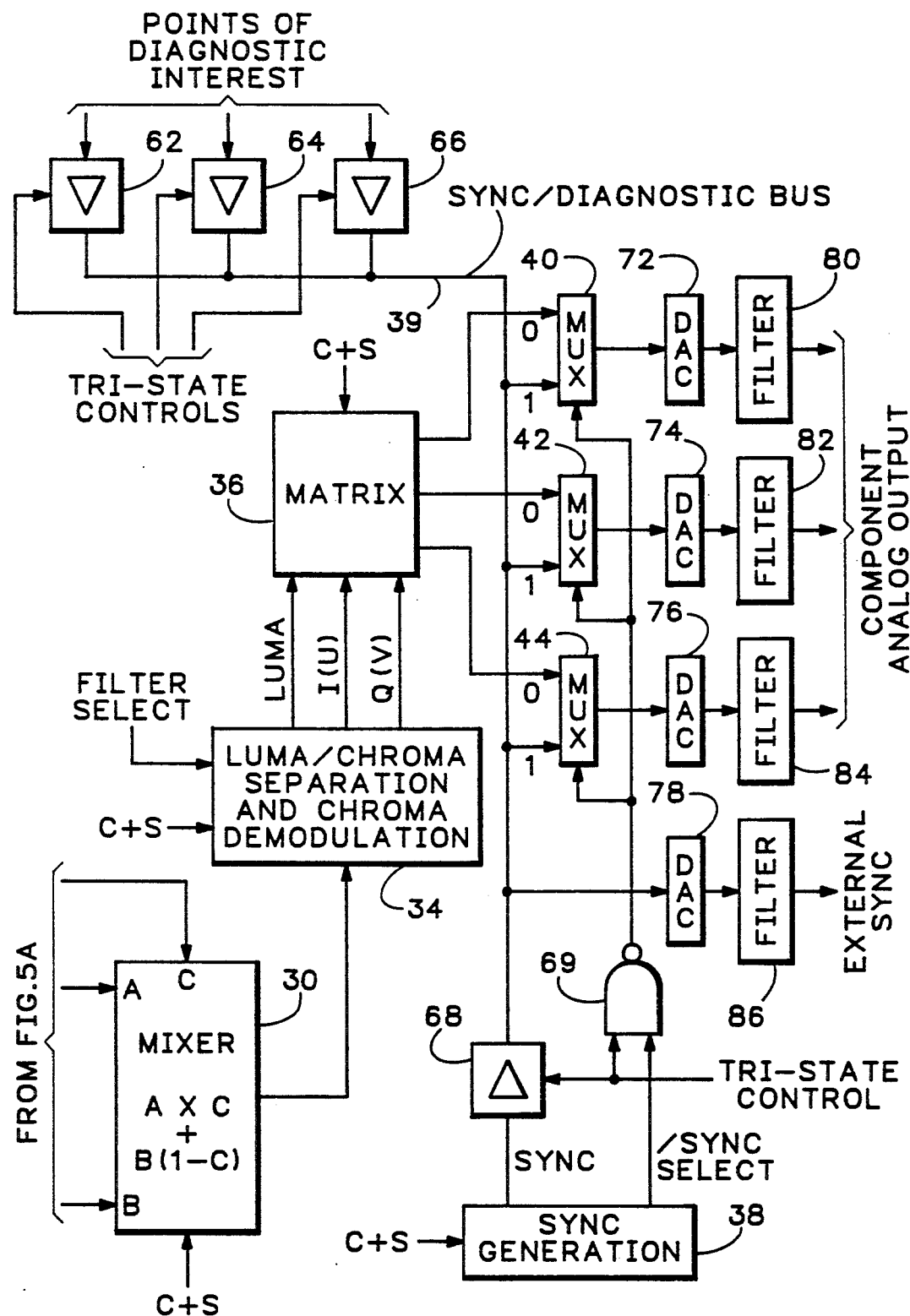

Referring now to FIG. 5, the concepts discussed above for an improved color television composite video signal decoder architecture may be combined to produce a decoder that is efficient and economical, and yet provides extra functionality and versatility. Input selection to an external selector 46 or router are monitored by the remote interface 50. The remote interface 50 forwards this information to the microprocessor 56 over a bus 57 that provides a communication link between the microprocessor 56 and the remote interface 50, the local interface 48 and the microprocessor's external memory 58.

In response to this information, the microprocessor 56 retrieves from its external memory 58 a previously stored delay value for the particular input selected and sends a corresponding delay control signal to the timing circuitry 54.

The selected composite video input from the selector 46 enters the decoder and is filtered and converted to a digital representation by filter and analog-to-digital converter 70. Timing circuitry 54 provides a clock signal to the analog-to-digital converter portion of filter and A/D converter 70 that is used to sample the analog signal. This clock is at 4*$f_{sc}$ and is the product of a color lock block, as shown in FIG. 1, that is internal to the timing circuitry 54.

As described above, the timing circuitry 54 monitors the selected input from the selector 46 and derives from it $t_0$, the start of frame time. In response to $t_0$, the timing circuitry 54 generates an input pulse that starts the FIFO 52 storing the selected input signal. The timing circuitry generates an output pulse to initiate output from the FIFO 52 after a delay determined by the delay control signal from the microprocessor 56. The timing circuitry 54 monitors the time equalized selected composite video output of the FIFO 52 and from it generates clock signals and sync signals (C+S) that are used by most of the rest of the decoder circuitry.

The time equalized selected composite video output of the FIFO 52 goes to the "0" input of MUX 26. During normal operation, the signal that selects the output of MUX 26, test signal, is low and the time equalized selected composite video signal passes through to the "A" input of mixer 30. With test signal low, MUX 28 passes a fixed blanking level through to the "B" input of mixer 30. As was more fully explained above, mixer 30 smoothly mixes back and forth between its A and B inputs according to the content of its C input, the envelope from envelope generator 32, which is directed to produce zero-to-one or one-to-zero transitions by the envelope control signal from the test signal generation and blanking sequencer 18.

The test signal generator and blanking sequencer 18, test signal memory A 20 and test signal memory B operate as described above to produce test pattern color bars sequence at the "1" inputs to MUXs 26 and 28. When the signal test signals is on active high, the "1" inputs to MUXs 26 and 28 are signals mixed back and forth through transitions by mixer 30 under the control of the envelope generated by the envelope generator 32 under the control of the envelope control signal.

The luma/chroma separation and chroma demodulation circuitry 34 is the same as that discussed in FIG. 2, containing the same elements of FIG. 1, except that a filter select input is now shown. The filter select input from the microprocessor 56 represents all of the types of filter control information that might be necessary depending on the type of filters employed. It includes such things as selection between 1, 2 or 3 dimensional filters, selection of coefficients for use in digital filters, adaptive filter type or threshold and bandwidth selection.

The matrix circuitry 36, the sync generation circuitry 38, the MUXs 40, 42, 44, and the tri-state buffer amplifiers 62, 64, 66, 68 all operate as described above. However, additional output circuits, digital-to-analog converters 72, 74, 76, 78 and filters 80, 82, 84, 86, are now shown. One additional gate, NAND gate 69, whose function will presently be explained, now appears also. There is one additional difference that is not apparent from FIG. 4, and that is that now one of the points of diagnostic interest internal to the decoder is a digital sweeping oscillator, either internal to the decoder or coming in through a jack from external test equipment.

In the preferred embodiment of the television signal decoder shown in FIG. 5, when the tri-state control signal that controls tri-statable buffer amplifier 68 goes low, the output of NAND gate goes high and stays there without regard to the state of sync select. The high output of NAND gate 69 selects the "1" inputs to MUXs 40, 42, 44 and thereby couples whatever signal is on the sync/diagnostic bus to the inputs of DACs 72, 74, 76. Thus, if the microprocessor 56 then activates the digital sweeping oscillator or other signal source, internal or external to the decoder, and activates the tri-state control signal to the tri-statable buffer amplifier associated with that signal source, that source can be used to test the output DACs 72, 74, 76 and filters 80, 82, 84.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

I claim:

1. A color television signal decoder comprising:
    a mixer having a first input, a second input, an envelope input and an output;
    a test signal generator and blanking sequencer having a signal select input, a clock signal input and a sync signal input, and having a first test signal output, a second test signal output, a test signals active output and an envelope control output;
    a first test signal memory having an input and an output, with the input coupled to receive the first test signal output;
    a second test signal memory having an input and an output, with the input coupled to receive the second test signal output;
    an envelope generator operable in response to the envelope control output of the test signal generator and blanking sequencer to produce a transition envelope output, the transition envelope output being coupled to the envelope input of the mixer;
    a first signal selection means having a first input, a second input, a select input and an output, with the first input coupled to receive a composite video signal and the second input coupled to receive the output of the first test signal memory, and the select input coupled to the test signals active output of the test signal generator and blanking sequencer, and with the output coupled to the first input of the mixer; and
    a second signal selection means having a first input, a second input, a select input and an output, with the first input coupled to receive a blanking level and the second input coupled to receive the output of the second test signal memory, and the select input coupled to the test signals active output of the test signal generator and blanking sequencer, and with the output coupled to the second input of the mixer.

2. A color television signal decoder according to claim 1 wherein the mixer output is the sum of the first input times the envelope input and the second input times the quantity one minus the envelope input.

3. A color television signal decoder according to claim 1 wherein the test signal generator and blanking sequencer comprises a state machine.

4. A color television signal decoder according to claim 1 wherein the transition envelope output of the envelope generator comprises a sine squared of x function.

5. A color television signal decoder according to claim 1 wherein the transition envelope output of the envelope generator comprises one hundred and fifty seven phased envelopes for use in PAL systems.

6. A color television signal decoder according to claim 1 wherein the first and second signal selection means comprise multiplexers.

7. A color television signal decoder comprising:
a sync/diagnostic bus coupled to an external sync output;
a plurality of tri-statable buffer amplifiers each with an output coupled to the sync/diagnostic bus, each buffer amplifier having a signal input that is a point of diagnostic interest, and each buffer amplifier having as its control input a unique tri-state control signal;
a sync tri-statable buffer amplifier with an output coupled to the sync/diagnostic bus, and having a sync signal input and a unique tri-state control signal input; and
a sync generation circuit for producing a sync signal output, the sync signal output being coupled to the sync signal input of the sync tri-statable buffer amplifier; and
control means, for generating the unique tri-state control signals, only one of the unique tri-state control signals being active at any particular time, so that when the unique tri-state control signal associated with the sync tri-statable buffer amplifier is active sync signals appear on the sync/diagnostic bus and when the unique tri-state control signal associated with the sync tri-statable buffer amplifier is inactive the sync/diagnostic bus is available for coupling one of the points of diagnostic interest to the external sync output.

8. A color television signal decoder according to claim 7 wherein one of the points of diagnostic interest internal to the decoder is a test signal source and the decoder further comprises:
three component video generating means, having a first output, a second output and a third output;
a first signal selecting means having two signal inputs, a control input and an output, the first input being coupled to receive the first output of the three component video generating means, the second input being coupled to receive the sync/diagnostic bus, and the control input being coupled to receive a mux select signal for selecting in a first state the first output and in a second state the second output;
a first output circuitry having an input and an output, with the input coupled to receive the output of the first signal selecting means, and the output being to an exterior of the decoder;
a second signal selecting means having two signal inputs, a control input and an output, the first input being coupled to receive the second output of the three component video generating means, the second input being coupled to receive the sync/diagnostic bus, and the control input being coupled to receive the mux select signal for selecting in a first state the first output and in a second state the second output;
a second output circuitry having an input and an output, with the input coupled to receive the output of the second signal selecting means, and the output being to the exterior of the decoder;
a third signal selecting means having two signal inputs, a control input and an output, the first input being coupled to receive the third output of the three component video generating means, the second input being coupled to receive the sync/diagnostic bus, and the control input being coupled to receive the mux select signal for selecting in a first state the first output and in a second state the second output;
a third output circuitry having an input and an output, with the input coupled to receive the output of the third signal selecting means, and the output being to the exterior of the decoder;
gating means having a first input, a second input and an output, with the first input being coupled to receive the unique tri-state control signal input of the sync tri-statable buffer amplifier, and with the second input being coupled to receive a sync select input, and with the output being the mux select signal, the gating means constantly producing the second state of the mux select signal when the unique tri-state control signal input is inactive and alternating between producing the first state and second state of the mux select signal according to the state of the sync select input when the unique tri-state control signal input is inactive, so that when the unique tri-state control signal input is inactive and a one of the plurality of unique tri-state control signals associated with the test signal source is active the output of the test signal source is applied to the inputs of the first, second and third output circuitries for testing purposes.

9. An apparatus for compensating for timing variations between alternative composite video sources, the apparatus comprising:
a memory for storing delay data associated with each alternative composite video source;
a first-in, first-out buffer memory for receiving a present source of video from among the alternative composite video sources in response to an input pulse and for outputting a time compensated present source of video to a decoder in response to an output pulse;
timing circuitry for producing the input pulse in response to beginning of frame information derived from the present source of video, and for producing an output pulse according to delay control signals; and
a controller for monitoring which alternative composite video source is the present source, retrieving from memory delay data associated with the present source, and providing the delay control signals to the timing circuitry.

10. An apparatus according to claim 9 wherein the timing circuitry has the additional function of producing clock signals and sync signals derived from the time compensated present source of video.

11. An apparatus according to claim 10 wherein the controller comprises a microprocessor.

* * * * *